United States Patent
Hatano et al.

(10) Patent No.: US 7,167,841 B2
(45) Date of Patent: Jan. 23, 2007

(54) CONTENT DISTRIBUTING SYSTEM, CONTENT DISTRIBUTING SERVICE SERVER, AND COMMUNITY SITE SERVER

(75) Inventors: Kouji Hatano, Tokyo (JP); Satoshi Terasaki, Oomiya (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 680 days.

(21) Appl. No.: 09/979,940

(22) PCT Filed: May 26, 2001

(86) PCT No.: PCT/JP01/02413

§ 371 (c)(1),
(2), (4) Date: Nov. 27, 2001

(87) PCT Pub. No.: WO01/75715

PCT Pub. Date: Oct. 11, 2001

(65) Prior Publication Data

US 2002/0161712 A1    Oct. 31, 2002

(30) Foreign Application Priority Data

Mar. 30, 2000    (JP) .............................. 2000-094982

(51) Int. Cl.
*G06Q 99/00* (2006.01)
*H04K 1/00* (2006.01)
*H04L 9/00* (2006.01)

(52) U.S. Cl. .................. 705/56; 709/202; 709/203; 709/217; 709/218; 709/219; 709/220; 709/221; 709/222; 709/223; 709/224; 709/225; 709/226; 709/227; 709/232; 707/3; 707/10; 707/102; 705/27; 705/10; 715/513

(58) Field of Classification Search .................. 705/56, 705/27, 10; 707/3, 10, 102; 709/202, 203, 709/217–232; 715/513
See application file for complete search history.

(56) References Cited

U.S. PATENT DOCUMENTS 5,390,297 A * 2/1995 Barber et al. .................. 726/29

(Continued)

FOREIGN PATENT DOCUMENTS

EP    0 864 959 A2    9/1998

(Continued)

OTHER PUBLICATIONS

Get in the Game A Players Guide to the Coolest Video Games of the Season; [Sooner Edition] Syory by Tracy Collins; Pittsburgh Post—Gazette Pittsburgh, Pa.; Nov. 12, 1999, p. 25.*

(Continued)

*Primary Examiner*—James A Reagan
(74) *Attorney, Agent, or Firm*—Pearne & Gordon LLP

(57) ABSTRACT

The invention provides a system where additional services using other sites connected over a network are made available when a content is delivered via a network.

According to the invention, when user A receives delivery of a content from a content delivery service server (1) by using a terminal (4), predetermined information is transmitted from the server (1) to user A or a community server (2). With this information, the preferential use of community sites or additional use of services is made available to user A. The preferential use is for example the preferential use of a community site bulletin board. The additional use is re-delivery of delivered contents by using community sites.

8 Claims, 10 Drawing Sheets

U.S. PATENT DOCUMENTS

| | | | | |
|---|---|---|---|---|
| 5,768,382 A | * | 6/1998 | Schneier et al. | 380/251 |
| 5,963,916 A | * | 10/1999 | Kaplan | 705/26 |
| 5,982,891 A | | 11/1999 | Ginter et al. | |
| 6,047,265 A | | 4/2000 | Sugimori | |
| 6,669,564 B1 | * | 12/2003 | Young et al. | 463/42 |
| 6,782,397 B1 | * | 8/2004 | Tanaka | 707/104.1 |
| 6,925,444 B1 | * | 8/2005 | McCollom et al. | 705/14 |
| 6,963,850 B1 | * | 11/2005 | Bezos et al. | 705/26 |

FOREIGN PATENT DOCUMENTS

| | | | |
|---|---|---|---|
| JP | 10-85456 A | | 4/1998 |
| JP | 0 864 959 A2 | * | 9/1998 |
| JP | 11-143955 A | | 5/1999 |
| JP | 11-282863 A | | 10/1999 |
| JP | 2000-13371 A | | 1/2000 |
| WO | WO 00/08909 | | 2/2000 |

OTHER PUBLICATIONS

St. Paul Pioneer Press. Monday, Feb. 26, 1996, Julio Ojeda-Zapata, Staff Writer, Edition; Metro Final SEction; Tech, p. 8D.*

Phililip Keys et al., "Moriagaru Digital Ongaku Haishin; Security Kino ni Hyoujunka no Ugoki; Microsoft ya Sony mo Sannyu", Nikkei Internet Technology No. 22, Nikkei BP K.K. (Japan), Apr. 22, 1999, pp. 90-97.

Takeshi Otake, "Close Up Service: EC Shikou suru Net Kyoiku; Shougakkan, Gakken nado Zokuzoku Sannyu", Nikkei Multimedia, No. 41, Nikkei BP K.K. (Japan), Nov. 15, 1998, pp. 22-23.

Philip Keys, "Beikokuhatsu Internet Business Saizensen; Hirogaru Kojin no Internet Housou, Muryo Service Teikyo no ASP mo Tojou", Nikkei Internet Technology, No. 33, Nikkei BP K.K. (Japan), Mar. 22, 2000, pp. 134-137.

* cited by examiner

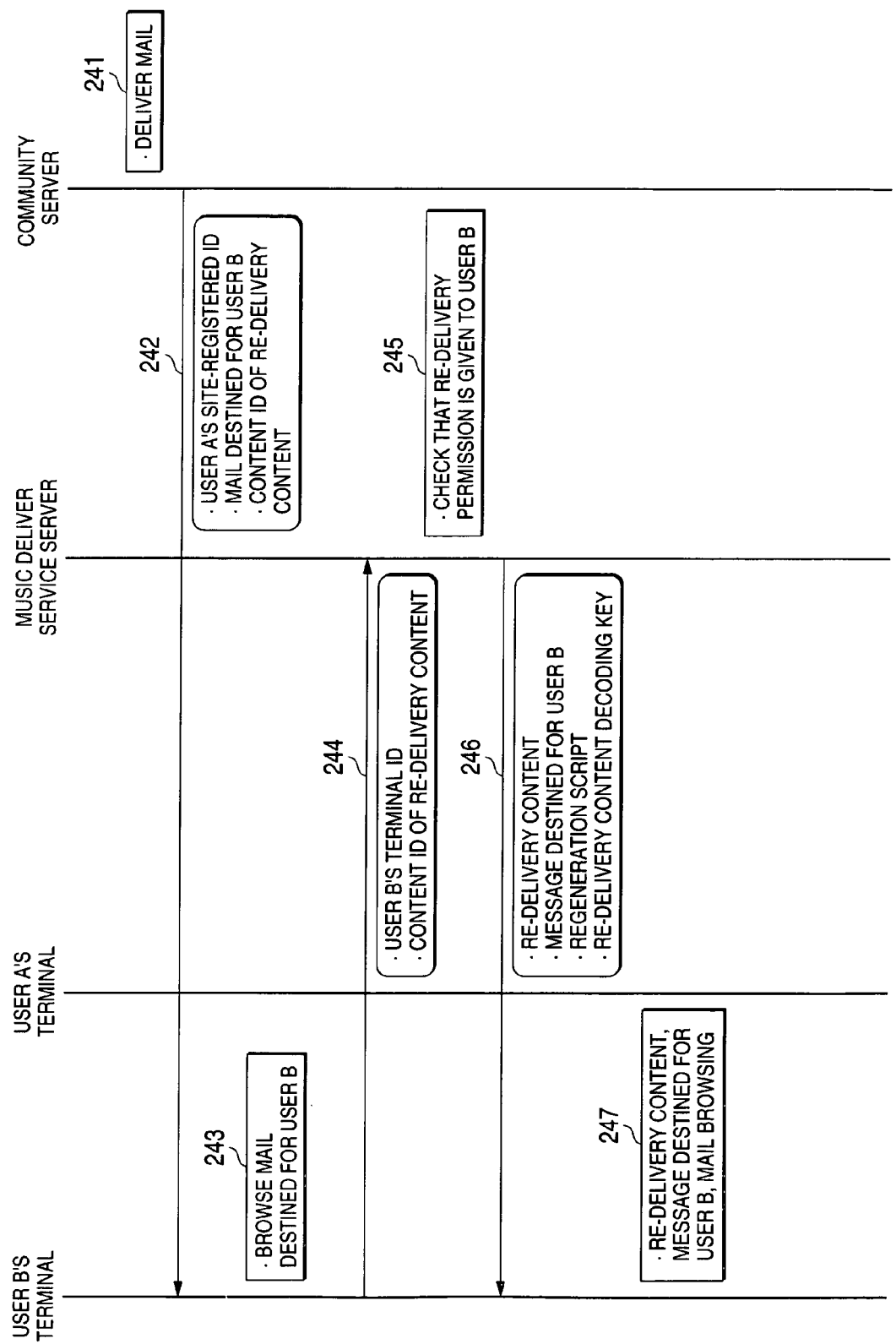

CONTENT DISTRIBUTING SYSTEM, CONTENT DISTRIBUTING SERVICE SERVER, AND COMMUNITY SITE SERVER

TECHNICAL FIELD

The present invention relates to a system for selling and delivering contents such as music and games.

BACKGROUND OF THE INVENTION

A service is in use that delivers at cost digital contents to a user terminal such as a computer or a portable telephone set from a content delivery service server connected to a network such as the internet. Delivered contents include music and game software contents. In this service, a purchaser accesses a content delivery site and selects desired contents from a variety of contents serviced by the site.

However, the aforementioned related art system assumes that a purchaser selects a content delivery service server to purchase a desired content. This does not raise the user's appetite for purchasing contents.

The invention aims at providing a system where additional services using other sites connected over a network are made available when a content is delivered from a specific content delivery service server, thus raising the user's appetite for purchasing contents by using a specific server.

DISCLOSURE OF THE INVENTION

The invention delivers information on the preferential use of community sites to a purchaser of the contents or a community site server when a content delivery service server has delivered contents via a network.

The invention delivers information on the purchase volume of contents as information on the preferential use when the content is music information and the community site is a fan club site of an artist related to the music information delivered.

The invention delivers information on the play performance of a game delivered as information on the preferential use when the content is game software and the community site is a fan site of the game delivered.

The preferential use includes preferential use of a bulletin board in a community site and financial aid in planning an offline meeting of community site users.

The content delivery service server delivers music information contents together with re-delivery permission information and purchaser of music information contents can re-deliver music information to other users of the community site via the community site.

BRIEF DESCRIPTION OF THE DRAWINGS

FIG. 12 shows the processing 3 of the sixth embodiment.

Figure 1:
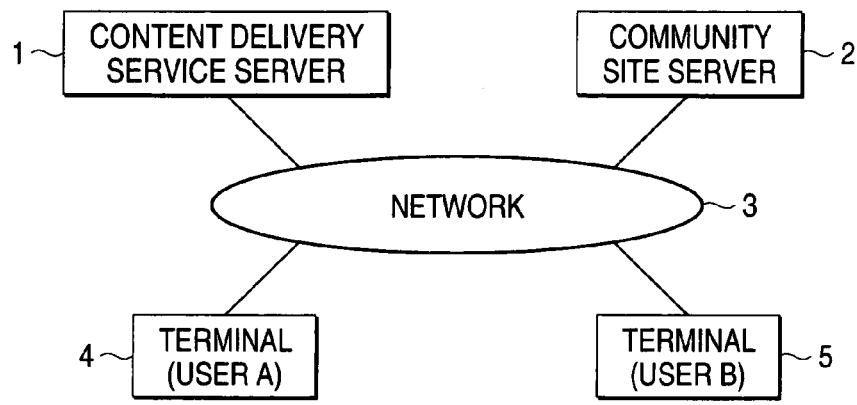
FIG. 1 shows the overall system of the invention.

In the drawings, a sign 1 represents a content delivery service server, 2 a community site server, 3 a network, 4 user A's terminal, 5 user B's terminal, 11 a communications section, 12 a controller, 13 a file, 21 a communications section, 22 a controller, and 23 a file.

BEST MODE FOR CARRYING OUT THE INVENTION

Embodiments of the invention will be described referring to FIGS. 1 through 12.

FIG. 1 shows the overall system of the invention. A content delivery service server 1 connected to a network 3 such as the internet is used to sell music information and game software contents and delivers contents to user terminals 4, 5 via the network 3.

A community site server 2 is connected to the network 3 in order to provide users with various services. A community site is for example a fan club site of an artist related to the music delivered or the game delivered.

Figure 2:
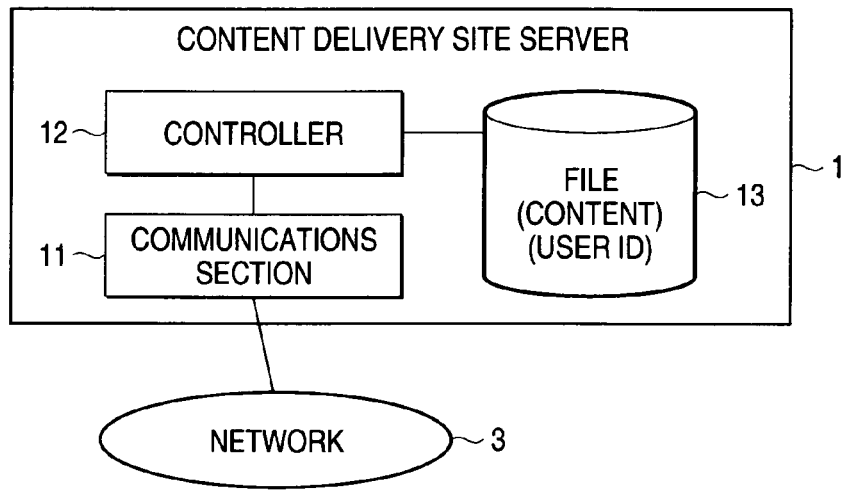
FIG. 2 is a general block diagram showing an example of a content delivery service server.

FIG. 2 shows a general block diagram of a content delivery service server 1 and includes a communications section 11, a controller 12, and a file 13. The communications section 11 controls data communications with the network 3. The controller 12 performs various processing of the server 2. The file 13 maintains data necessary for delivery such as contents to be delivered and user IDs as well as records delivery history.

Figure 3:
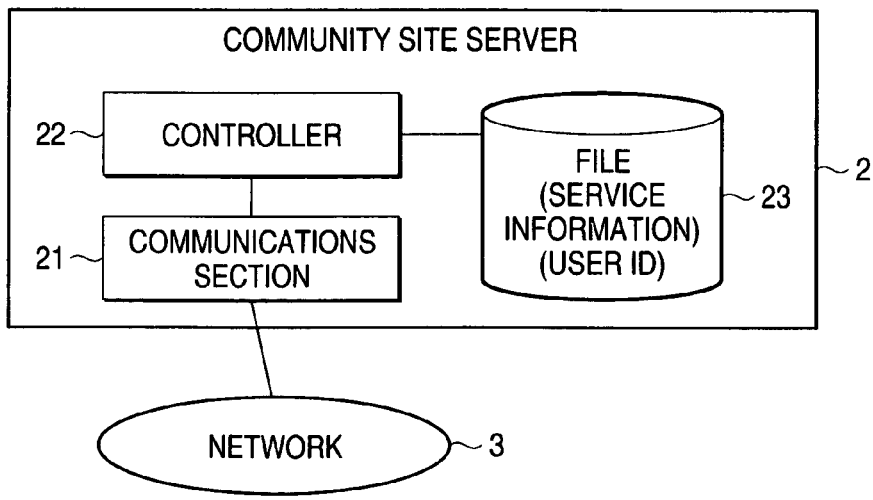
FIG. 3 is a general block diagram showing an example of a community site server.

FIG. 3 is a general block diagram showing the community site server 2 and includes a communications section 21, a controller 22, and a file 23. The communications section 21 controls data communications with the network 3. The controller 22 performs various processing of the server 2. The file 23 maintains data necessary for services such as service information per type of community site and user IDs.

When user A receives delivery of contents by using the terminal 4 from the content delivery service server 1, predetermined information is transmitted from the server 1 to user A or the community site server 2. With this information, the preferential use of community sites or additional use of services is made available to user A. The preferential use is for example the preferential use of a community site bulletin board. The additional use is re-delivery of delivered contents by using community sites.

Details will be given via specific embodiments.

(First Embodiment)

Figure 4:
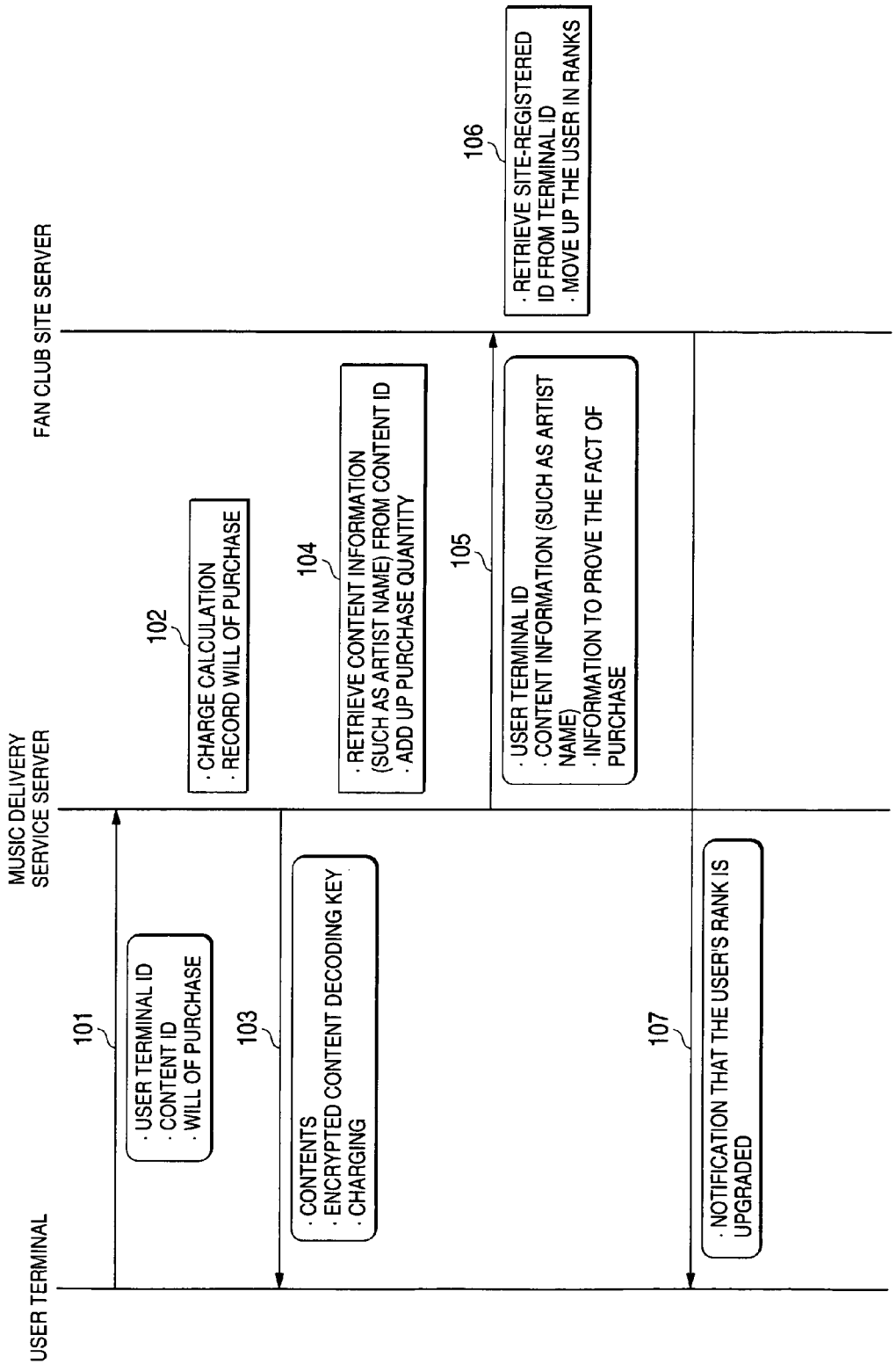
FIG. 4 shows the processing of the first embodiment.

This is a case where the content delivered from the content delivery service server 1 is music information and the community site is a fan club site of an artist, for example a player related to the music delivered. FIG. 4 shows processing by a user terminal 4, a music (content) delivery service server 1 and a fan club site server 2, and data transfer between servers in that case.

The user (for example user A) wishing to purchase a specific music information content, connects the terminal 4 to the music (content) delivery service server 1 via the network 3, and transmits a will to purchase a content, ID of the content to be purchased, and the user terminal ID (step 101). The user ID to be transmitted may be any ID that identifies the user, as well as the terminal ID. The music delivery service server 1 performs charging and records the content purchase history (step 102), and transmits an encrypted content, an encoding key for the encrypted content, and charging information to the user terminal 4 (step 103). Next, the music delivery service server 1 searches the fan club site of the artist based on the content ID (step 104), and transmits the terminal ID of the purchaser and music contents purchase information (step 105). The fan club site server 2 retrieves the user ID registered at the site, moves up the user in ranks (step 106), and transmits the rank upgrading information to the user terminal 4 (step 107).

The user accesses the fan club site server 2 via said network 3 and uses the fan club site (not shown). The bulletin board of the fan club site has restrictions on the authorized note count depending on the user's rank. Display color of the user name at data write differs with the rank. In case a user is moved up in ranks, the user is given the management authority of the bulletin board and is able to annotate the notes of other users. When an offline meeting of the users of the site is planned, the user is provided with financial aid according to his/her rank. Preferential services according to the rank may be selected as necessary as stipulated by the fan club site.

(Second Embodiment)

Figure 5:
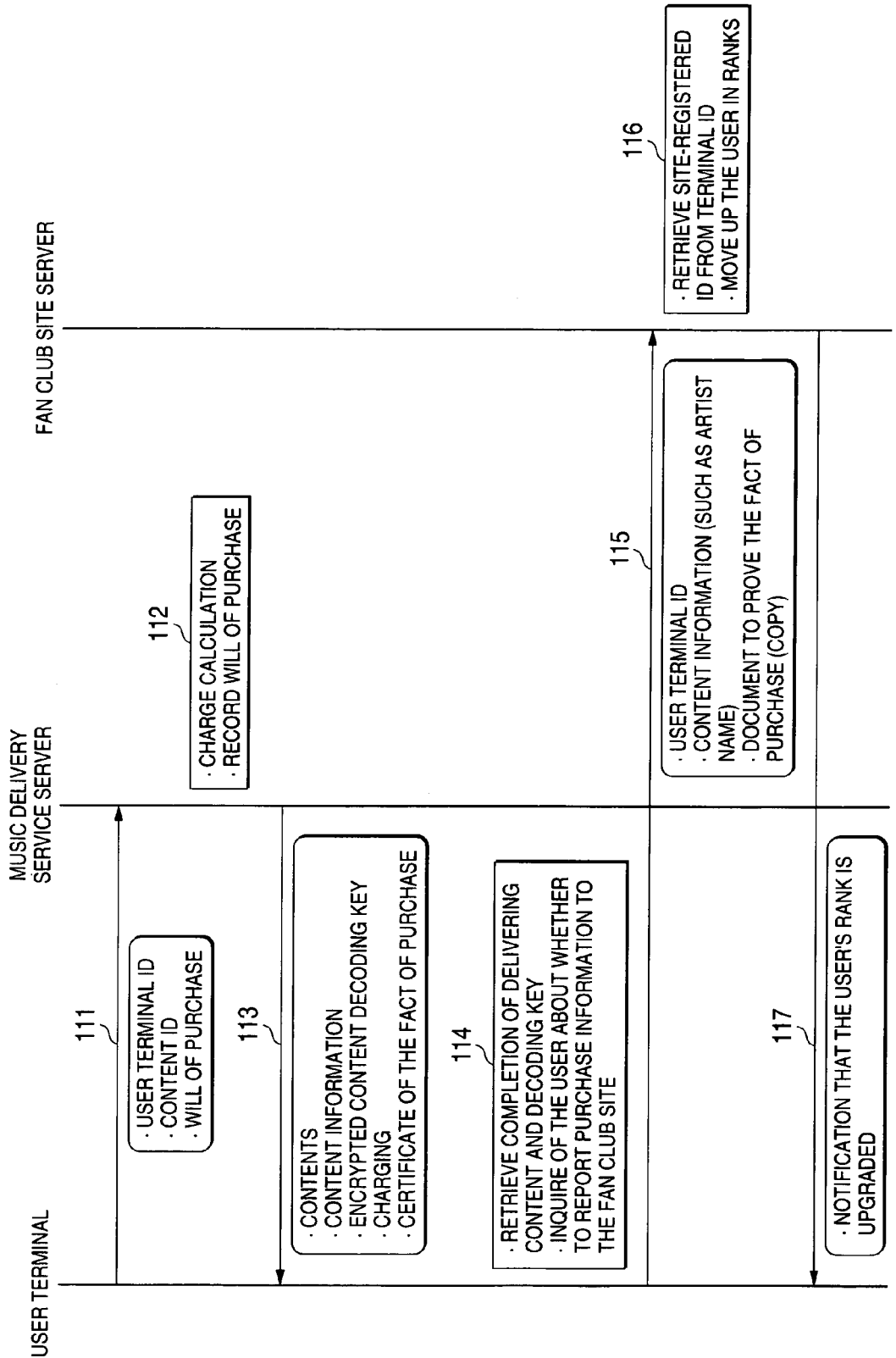
FIG. 5 shows the processing of the second embodiment.

This is an example where services similar to those in the first embodiment are provided except that a user is moved up in ranks according to a different procedure. FIG. 5 shows processing by a user terminal 4, a music delivery service server 1, and a fan club site server 2, and data transfer between servers.

The user wishing to purchase a specific music information content, same as the first embodiment, connects the terminal 4 to the music delivery service server 1 via the network 3, and transmits a will to purchase a content, ID of the content to be purchased, and the user terminal ID (step 111). The music delivery service server 1 performs charging and records the content purchase history (step 112), and transmits an encrypted content, an encoding key for the encrypted content, and charging information as well as purchased content information and content purchase proof information to the user terminal 4 (step 113). The user terminal 4 makes an inquiry to the user about whether to report the content purchase proof information to the fan club site (step 114). In case the information is to be reported, the user terminal 4 transmits the terminal ID of the purchaser, content information and content purchase proof information (copy) to the fan club site server 2 via the network 3 (step 115). Report to the fan club site need not be necessarily performed at delivery but plural pieces of purchase proof information (copy) may be transmitted alter as a group. The fan club site server 2 retrieves the user ID registered at the site based on the transmitted user terminal ID, moves up the user in ranks (step 116), and transmits the rank upgrading information to the user terminal 4 (step 117). Use of the fan club site is the same as that in the first embodiment.

(Third Embodiment)

Figure 6:
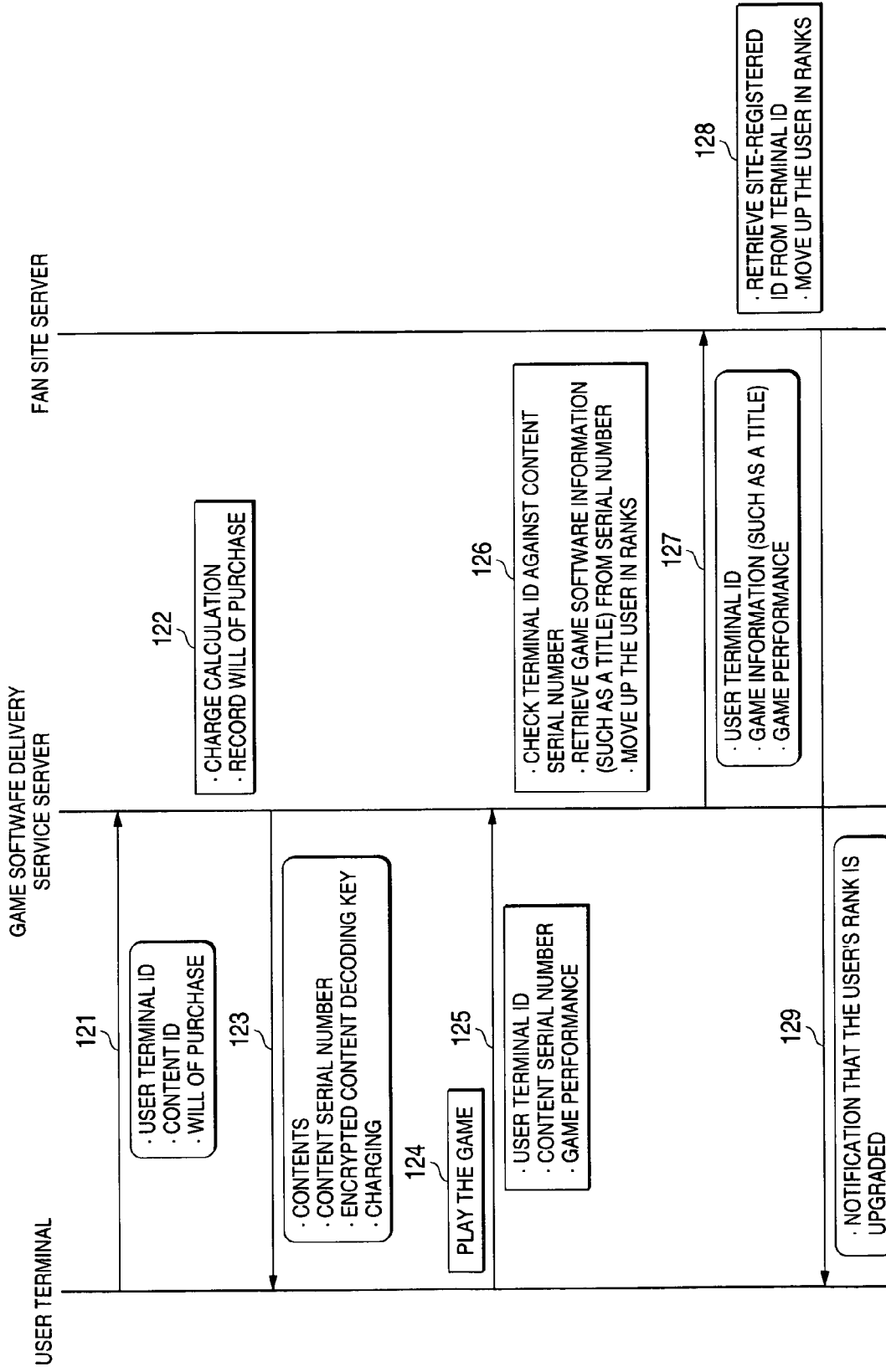
FIG. 6 shows the processing of the third embodiment.

This is a case where the content delivered from the content delivery service server 1 is game software and the community site is a fan site of the game delivered. FIG. 6 shows processing by a user terminal 4, a game software (content) delivery service server 1, and a game fan site server 2, and data transfer between servers in that case.

The user wishing to purchase a specific game software information content, connects the terminal 4 to the game software delivery service server 1 via the network 3, and transmits a will to purchase a content, ID of the content to be purchased, and the user terminal ID (step 121). The game software delivery service server 1 performs charging and records the content purchase history (step 122), and transmits an encrypted content, an encoding key for the encrypted content, a content serial number and charging information to the user terminal 4 (step 123). The user plays the delivered game (step 124) and transmits the game performance together with the serial number of the delivered game software and terminal ID to the game software delivery service server 1 (step 125). The game software delivery service server 1 checks the game software serial number against the purchase history and retrieves the game title based on the serial number (step 126), and transmits the user terminal ID, game title and game performance to the game fan site server 2 (step 127). The game fan site server 2 retrieves the user ID registered at the site based on the transmitted user terminal ID, moves up the user in ranks (step 128), and transmits the rank upgrading information to the user terminal 4 (step 127). Use of the game fan site includes the same services as those in the first embodiment.

(Fourth Embodiment)

Figure 7:
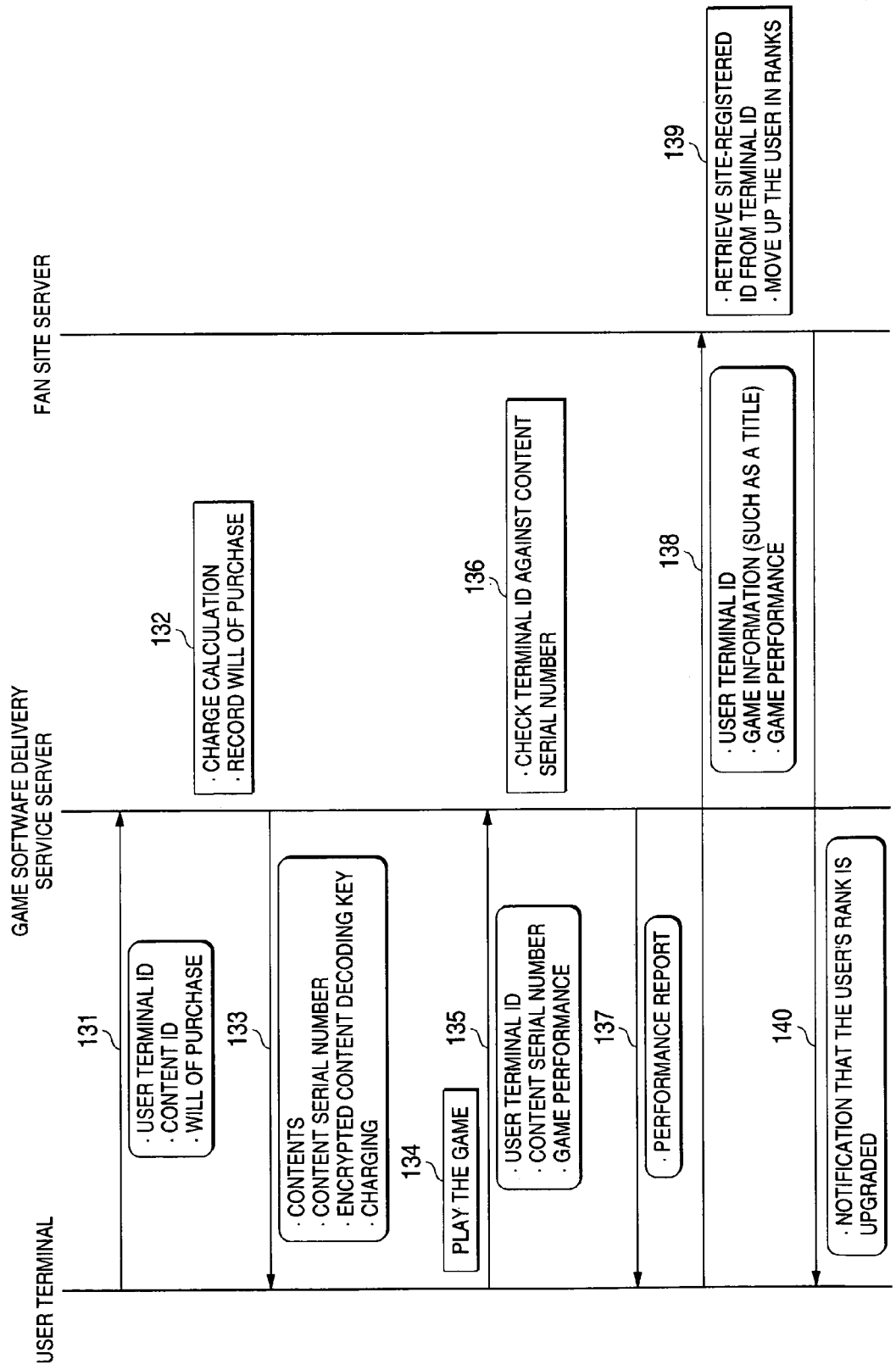
FIG. 7 shows the processing of the fourth embodiment.

This is an example where services similar to those in the third embodiment are provided except that a user is moved up in ranks according to a different procedure. FIG. 7 shows processing by a user terminal 4, a game software delivery service server 1 and a game fan site server 2, and data transfer between servers.

The user wishing to purchase a specific game software information content, same as the third embodiment, connects the terminal 4 to the game software delivery service server 1 via the network 3, and transmits a will to purchase a content, ID of the content to be purchased, and the user terminal ID (step 131). The game software delivery service server 1 performs charging and records the content purchase history (step 132), and transmits an encrypted content, an encoding key for the encrypted content, a content serial number and charging information to the user terminal 4 (step 133). The user plays the delivered game (step 134) and transmits the game performance together with the serial number of the delivered game software to the game software delivery service server 1 (step 135). The game software delivery service server 1 checks the game software serial number against the purchase history (step 136) and transmits the game performance report to the user terminal 4 (step 137). The user terminal 4 transmits the game title information and the performance report together with the terminal ID to the game fan site server 2 via the network 3 (step 138). The fan site server 2 retrieves the user ID registered at the site based on the transmitted user terminal ID, moves up the user in ranks (step 139), and transmits the rank upgrading information to the user terminal 4 (step 140). Use of the game fan site is the same as that in the third embodiment.

(Fifth Embodiment)

Figure 8:
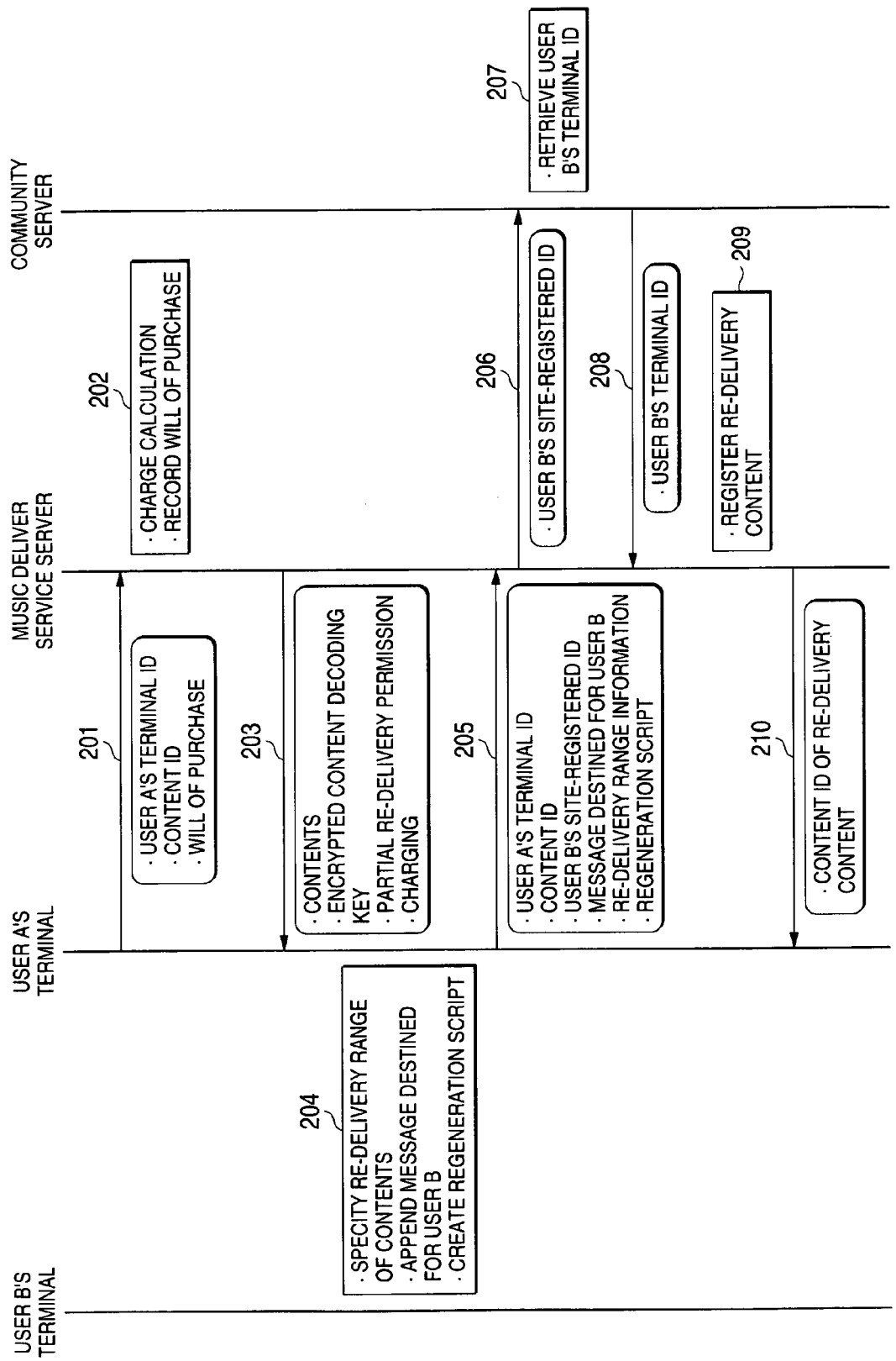
FIG. 8 shows the processing 1 of the fifth embodiment.
Figure 9:
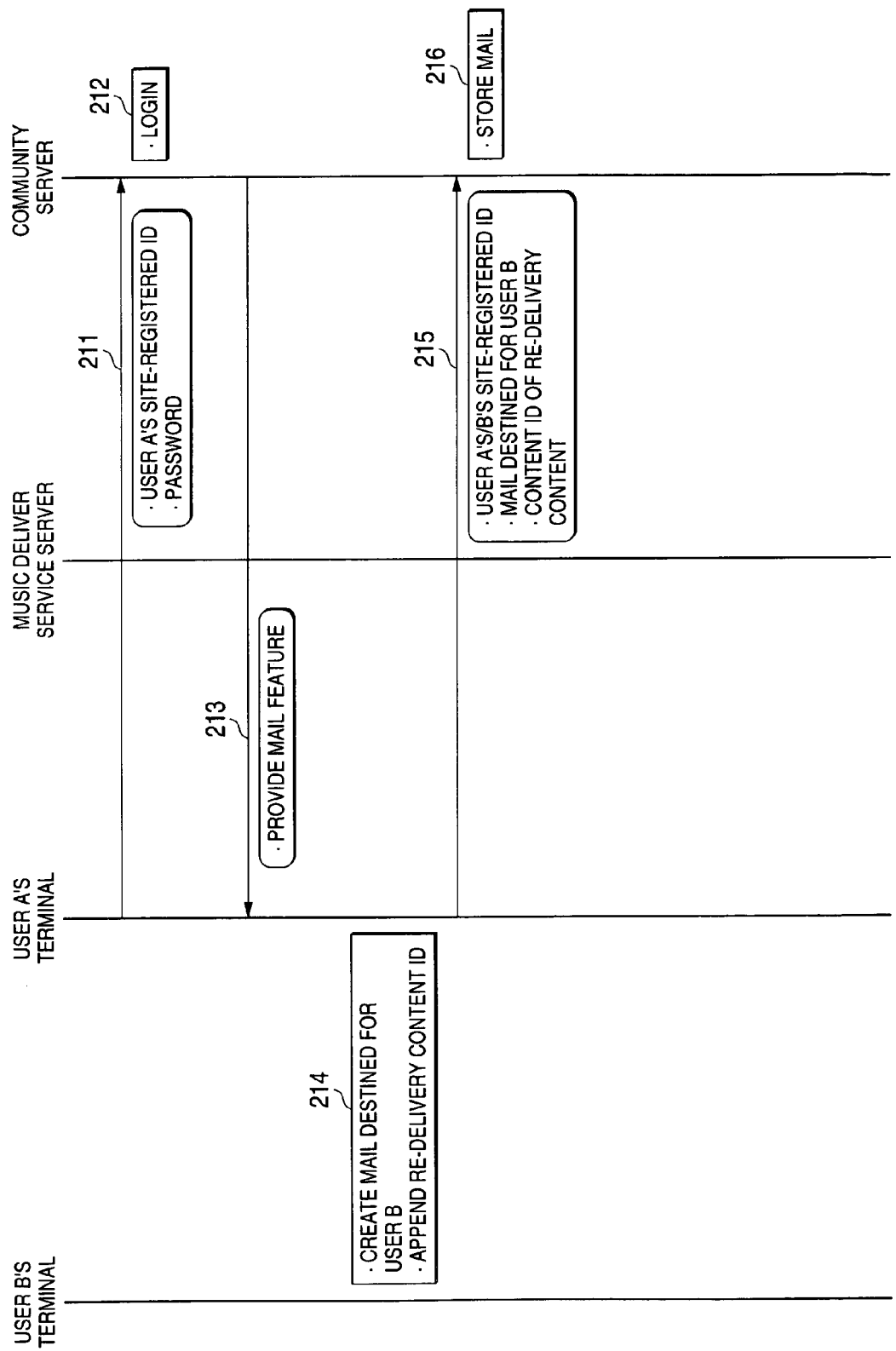
FIG. 9 shows the processing 2 of the fifth embodiment.
Figure 10:
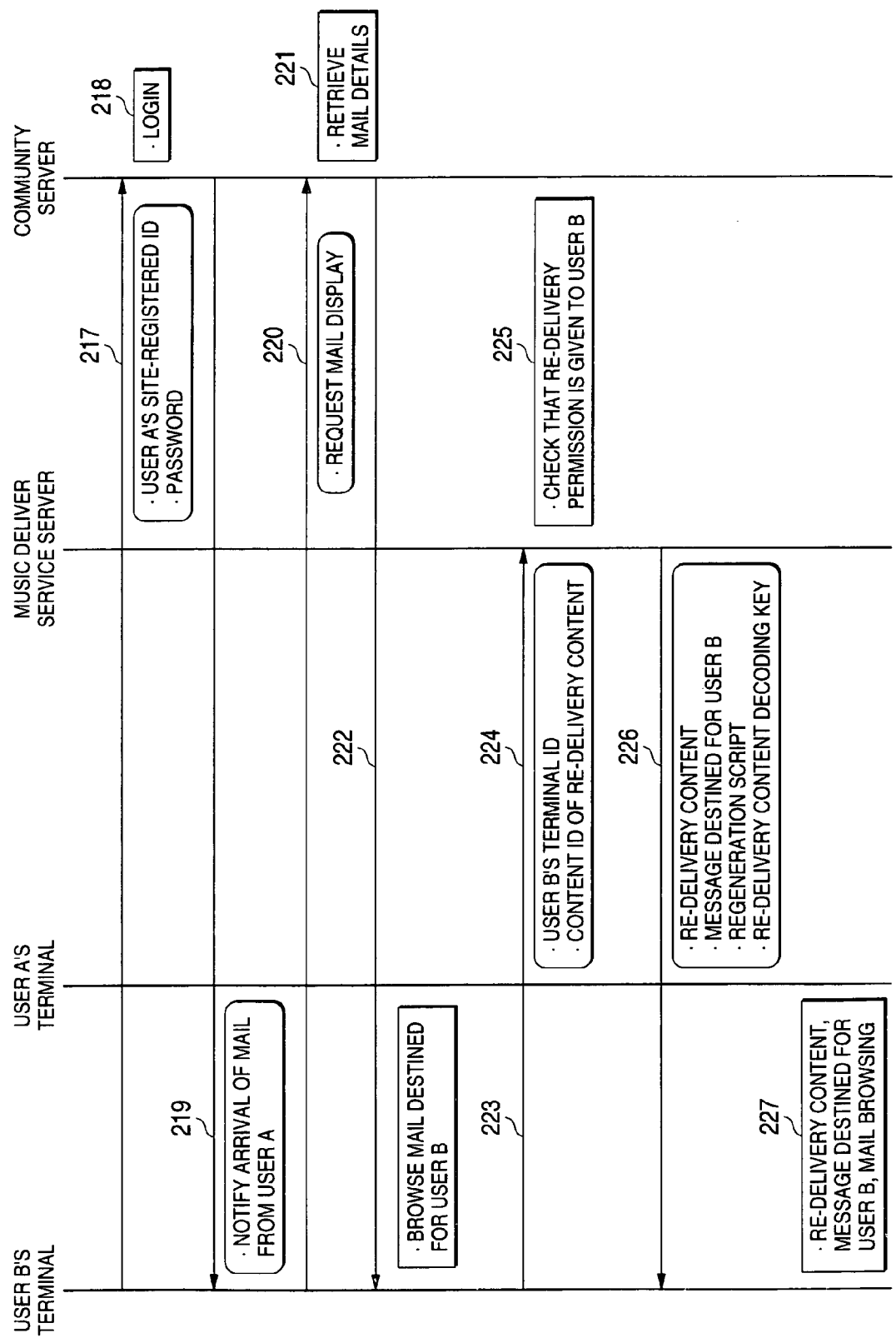
FIG. 10 shows the processing 3 of the fifth embodiment.

This is a case where the content delivered from the content delivery service server 1 is music information and the purchased music content can be re-delivered to user B who is a friend of user A via the community site. In this case, the community site may not be the fan club site of the music. FIGS. 8 through 10 show processing by the user A's terminal 4, the user B's terminal 5 and a music (content) delivery service server 1, and data transfer between servers.

As shown in FIG. 8, user A wishing to purchase a specific music information content, connects the terminal 4 to the music delivery service server 1 via the network 3, and transmits a will to purchase a content, ID of the content to be purchased, and the user A's terminal ID (step 201). The music delivery service server 1 performs charging and records the content purchase history (step 202), and transmits an encrypted content, an encoding key for the encrypted content, partial re-delivery permission information and charging information to the user terminal 4 (step 203). The partial re-delivery permission information refers to a permission to re-deliver part of a delivered content or a content whose quality has been lowered to others. The user A's terminal 4 specifies the range of re-delivery of delivered music content and creates a message to user B as a consignee, and further creates a regeneration script describing how to play back the content with appended message (step 204). The user A's terminal 4 transmits the message to user B and the regeneration script thus created together with the content ID, user A's terminal ID, and user B's ID registered at the community site to the music delivery service server 1 (step 205). The music delivery service server 1 transmits the user B's ID registered at the community site to the community site server 2 (step 206) and receives from the community site server 2 the user B's terminal ID retrieved by the community site server 2 (step 207). The music delivery service server 1 registers the re-delivery content at the file (step 209), then transmits the re-delivery content ID to the user A's terminal 4 (step 210).

As shown in FIG. 9, when user A that received the re-delivery content ID, transmits the registered ID and password to the community site server 2 with an intention to give the re-delivery content to user B (step 211), the community site server 2 logs in (step 212) and provides the user A's terminal 4 with a mailing feature (step 213). The user A's terminal 4 creates a mail destined for user B with the re-delivery content appended (step 214) and transmits the resulting mail together with the registered IDs of user A and user B to the community site server 2. The community site server 2 stores the mail (step 216) and waits for an access.

As shown in FIG. 10, when user B transmits the registered ID and password to the community site server 2 (step 217), the community site server 2 logs in (step 218), and notifies the user B's terminal of the arrival of a mail (step 219). In response to a mail display request mad by the user B's terminal 5 (step 220), the community site server 2 retrieves the target mail (step 221) and transmits it to the user B's terminal (step 222). In case user B browses the mail (step 223) and, knowing that a present content is received from user A, acquires a content with appended message, the user B's terminal ID and the re-delivery content ID are transmitted from the user B's terminal to the music delivery service server 1 (step 224). The music delivery service server 1 checks that re-delivery permission is given to user B (step 225) and transmits the re-delivery content, message destined for user B, regeneration script and re-delivery content decoding key to the user terminal 5 (step 226). In this way, a content is given by user A to user B and user B can browse the re-delivery content and a message (step 227).

While a transaction of purchasing and delivering a content and a mail transmission/reception transaction are made by separate persons, these transactions may be performed in the same transaction.

(Sixth Embodiment)

Figure 11:
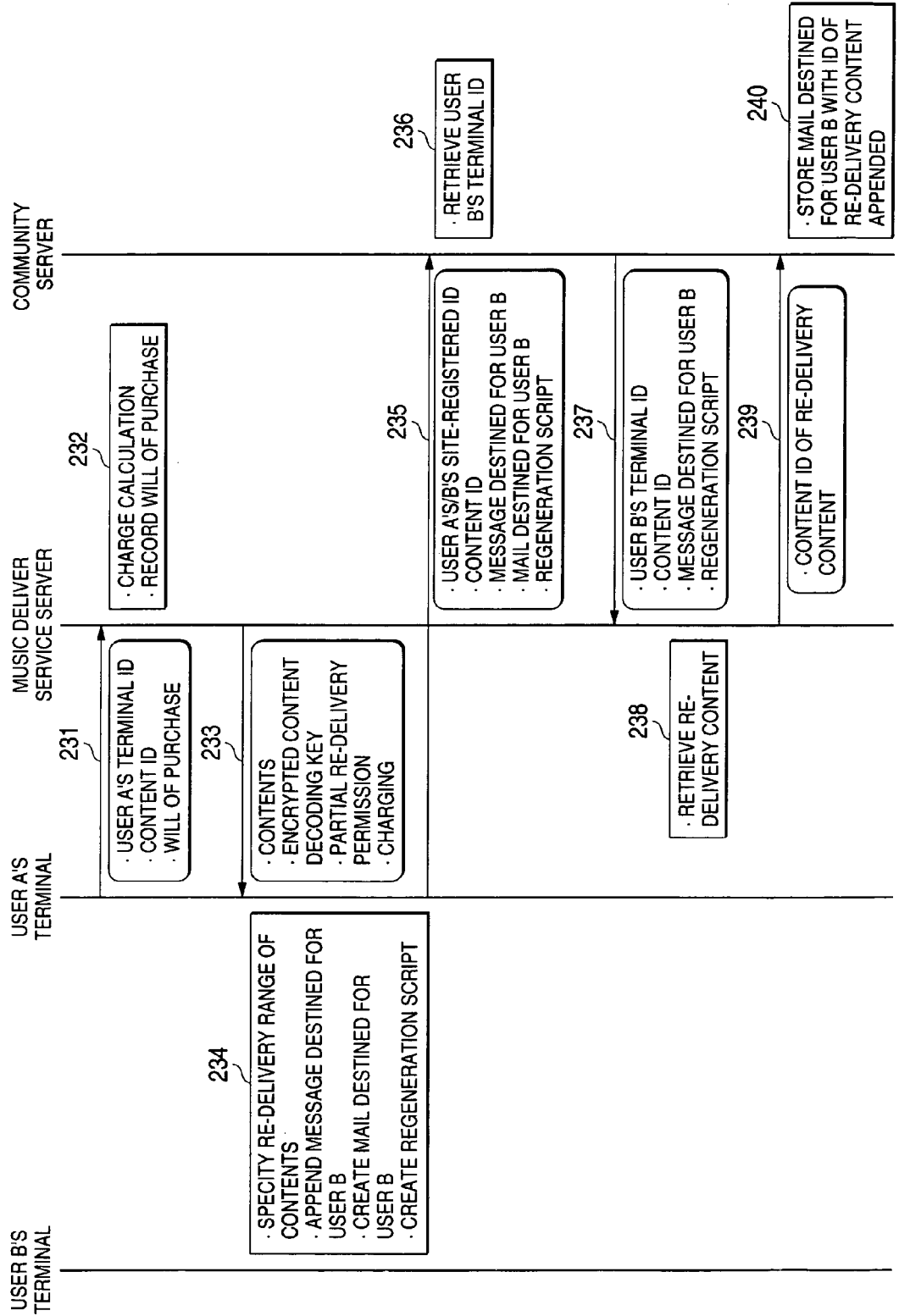
FIG. 11 shows the processing 1 of the sixth embodiment.

This is an example where services similar to those in the fifth embodiment are provided except that transmission of a re-delivery content and a message is made according to a different procedure. FIGS. 11 and 12 show processing by the user A's terminal 4, the user B's terminal 5, and a music (content) delivery service server 1 and a community site server 2, and data transfer between servers.

As shown in FIG. 11, user A wishing to purchase a specific music information content, connects the terminal 4 to the music delivery service server 1 via the network 3, and transmits a will to purchase a content, ID of the content to be purchased, and the user A's terminal ID (step 231). The music delivery service server 1 performs charging and records the content purchase history (step 232), and transmits an encrypted content, an encoding key for the encrypted content, partial re-delivery permission information and charging information to the user terminal 4 (step 233). The user A's terminal 4 specifies the range of re-delivery of delivered music content and creates a message to user B as a consignee and a regeneration script describing how to play back the content with appended message, and a mail destined for user B (step 234). The user A's terminal 4 transmits the message to user B, regeneration script and mail thus created together with the content ID, and user A's ID and user B's ID registered at the community site to the community site server 2 (step 235). The community site server 2 retrieves the terminal ID based on the user B's ID registered at the community site (step 236) and transmits the terminal ID together with the content ID, the message destined for user B and the regeneration script to the music delivery service server 1 (step 237). The music delivery service server 1 registers the re-delivery content (step 238) and transmits the content ID of the re-delivery content (step 239). The community site server 2 appends the re-delivery content ID to the mail destined for user B and stores the resulting mail (step 240).

As shown in FIG. 12, the community site server 2 delivers the mail (step 241). The user A's registration ID, the mail destined for user B and the content ID of the re-delivery content are transmitted to the user B' terminal 5 (step 242). In case user B browses the mail (step 243) and, knowing that a present content is received from user A, acquires a content with appended message, the user B's terminal ID and the re-delivery content ID are transmitted from the user B's terminal to the music delivery service server 1 (step 244). The music delivery service server 1 checks that re-delivery permission is given to user B (step 245) and transmits the re-delivery content, message destined for user B, regeneration script and re-delivery content decoding key to the user terminal 5 (step 246). In this way, a content is given by user A to user B and user B can browse the re-delivery content and a message (step 247).

In the sixth embodiment, only content IDs are transmitted/received between users and the community site so that transmission volume and storage volume at the community site are reduced thus relieving the load on the community site. A message is transmitted/received without intervention of the music delivery service server 1, which relieves the load on the music delivery service server 1.

<Industrial Applicability>

As understood from the preceding description, according to the invention, it is possible to provide a system where additional services using other sites connected over a network are made available by receiving a content delivered from a specific content delivery service server, thus raising the user's appetite for purchasing contents by using a specific content delivery service server.

The invention claimed is:

1. A content delivery service server for delivering contents, via a network, to a terminal which uses a community site service provided by a community site server for providing a community site service related to the content, said content delivery service server comprising:
   a communication section which performs data communications with the network;
   a controller which performs a process related to a delivery of the content; and data storage which maintains data necessary for processing of the controller, wherein, when the communication section receives a content ID of the content and user specifying information of the terminal, together with a purchase request of the content from the terminal, the controller performs a process comprising:

reading a content which corresponds to the content ID from the data storage;

having the communication section send the content to the terminal; and sending the user specifying information to the community site server, via the communication section, so as to update attribute data of the user managed by the community site server.

2. The content delivery service server according to claim 1, wherein, when the communication section receives a use history of the content and the user specifying information from the terminal, the controller performs a process comprising the step of having the communication section send a use history and the user specifying information to the community site server.

3. A content delivery service server for delivering a content, via a network, to a terminal which uses a community site service provided by a community site server for providing a community site service related to the content, said content delivery service server comprising:

a communication section which performs data communications with the network;

a controller which performs a process related to a delivery of the content; and data storage which maintains data necessary for processing of the controller, wherein, when the communication section receives a content ID of the content and user specifying information of the terminal, together with a purchase request of the content from the terminal, the controller performs a process comprising:

reading a decryption key of the content which corresponds to the content ID from the data storage;

having the communication section send the decryption key to the terminal; and sending the user specifying information to the community site server, via the communication section, so as to update an attribute data of the user managed by the community site server.

4. The content delivery service server according to claim 3, wherein, when the communication section receives a use history of the content and the user specifying information from the terminal, the controller performs a process comprising the step of having the communication section send a use history and the user specifying information to the community site server.

5. A community site server for providing a community site service related to a content to a terminal, which receives the content, via a network, from a content delivery service server, said community site server comprising:

a communication section which performs data communications with the network;

a controller which performs a process related to the community site service to the terminal; and data storage which maintains at least data including service information per type of community and a registered ID of a user and attribute data of the user, wherein, when the communication section receives user specifying information for specifying the user of the terminal from the content delivery service server or the terminal, the controller performs a process comprising:

searching a registered ID of the user of the terminal from the data storage based on the user specifying information;

updating the attribute data in the community site service of the user indicated by the registered ID; and notifying the terminal, via the communication section, of the update of the attribute data.

6. The community site server according to claim 5, wherein, when the communication section receives a use history of the content in the terminal and the user specifying information from the content delivery service server or the terminal, the controller performs a process comprising:

searching the registered ID of the user of the terminal from the data storage based on the user specifying information; and updating the attribute data in the community site service of the user indicated by the registered ID based on the use history of the content.

7. A community site server for providing a community site service related to a content to a terminal, which receives a decryption key of the content from a content delivery service server, via a network, said community site server comprising:

a communication section which performs data communications with the network;

a controller which performs a process related to the community site service to the terminal; and data storage which maintains at least data including service information per type of community and a registered ID of a user and attribute data of the user, wherein, when the communication section receives user specifying information for specifying the user of the terminal, from the content delivery service server or the terminal, the controller performs a process comprising:

searching the registered ID of the user of the terminal from the data storage based on the user specifying information;

updating the attribute data in the community site service of the user indicated by the registered ID; and notifying the terminal, via the communication section, of the update of the attribute data.

8. The community site server according to claim 7, wherein, when the communication section receives a use history of the content in the terminal and the user specifying information from the content delivery service server or the terminal, the controller performs a process comprising:

searching the registered ID of the user of the terminal from the data storage based on the user specifying information; and updating the attribute data in the community site service of the user indicated by the registered ID based on the use history of the content.

* * * * *

UNITED STATES PATENT AND TRADEMARK OFFICE
CERTIFICATE OF CORRECTION

PATENT NO. : 7,167,841 B2  
APPLICATION NO. : 09/979940  
DATED : January 23, 2007  
INVENTOR(S) : Kouji Hatano and Satoshi Terasaki Page 1 of 1

It is certified that error appears in the above-identified patent and that said Letters Patent is hereby corrected as shown below:

On title page section (22) PCT Filed: please delete "May" and insert --March--

Signed and Sealed this

Sixteenth Day of October, 2007

JON W. DUDAS  
*Director of the United States Patent and Trademark Office*